United States Patent [19]

Loiselle

[11] 4,149,206
[45] Apr. 10, 1979

[54] CLEANER FOR A PLAYING HEAD OF A CASSETTE PLAYER

[76] Inventor: Guy J. Loiselle, 8648 Terrace Dr., Delta, British Columbia, Canada

[21] Appl. No.: 811,813

[22] Filed: Jun. 30, 1977

Related U.S. Application Data

[63] Continuation-in-part of Ser. No. 685,593, May 12, 1976, abandoned.

[51] Int. Cl.² ............................................. G11B 5/41
[52] U.S. Cl. ................................ 360/128; 15/210 R; 274/47; 360/137
[58] Field of Search ................... 360/128, 137, 132; 274/47; 15/210 R

[56] References Cited

U.S. PATENT DOCUMENTS

| | | | |
|---|---|---|---|
| 3,439,922 | 4/1969 | Howard | 274/47 |
| 3,655,924 | 4/1972 | Puskas | 360/128 |
| 3,761,994 | 10/1973 | Becht | 360/128 |
| 3,881,195 | 4/1975 | Ono | 360/128 |
| 3,955,214 | 5/1976 | Post et al. | 360/128 |

Primary Examiner—Alfred H. Eddleman
Attorney, Agent, or Firm—Townsend and Townsend

[57] ABSTRACT

A cleaner of a playing head of a cassette player having a sprocket drive and a recess able to receive a cassette tape in a playing position. The cleaner comprises a hollow container dimensioned to be retainable within the recess. A hollow post is within the container, positioned to permit the sprocket drive of the player to enter the interior of the container. A cam is positioned on the post and is rotatable thereon. Drive means on the cam engage the sprocket drive of the tape player. There is an opening in one side of the container. A lever is pivotally located within the container to be reciprocable by the cam. The lever continuously engages the cam. Means at one end of the lever receives cleaning means for the playing head of the tape player. The cleaning means is able to project from the opening in the container to contact and clean the playing head when the cleaner is retained within the recess.

16 Claims, 5 Drawing Figures

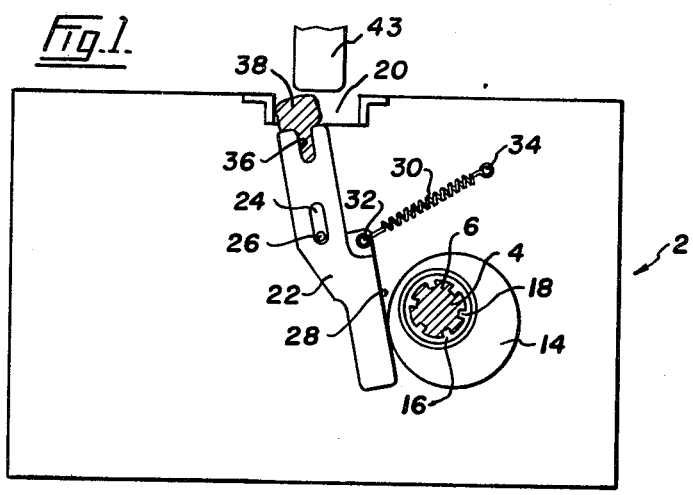
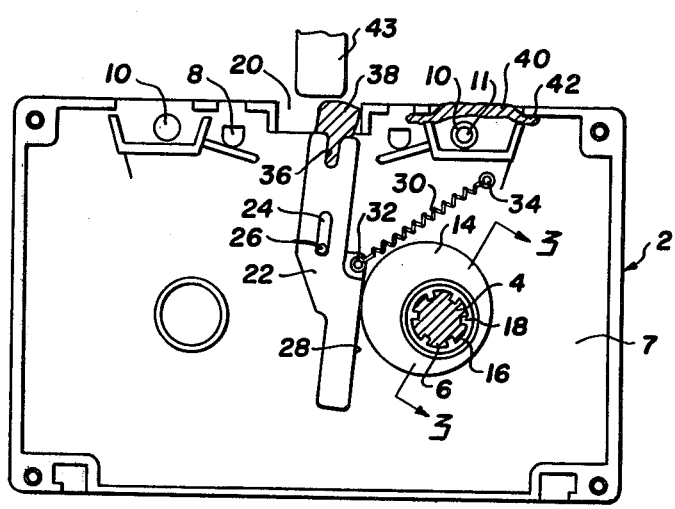
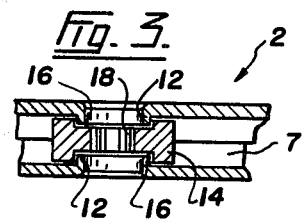

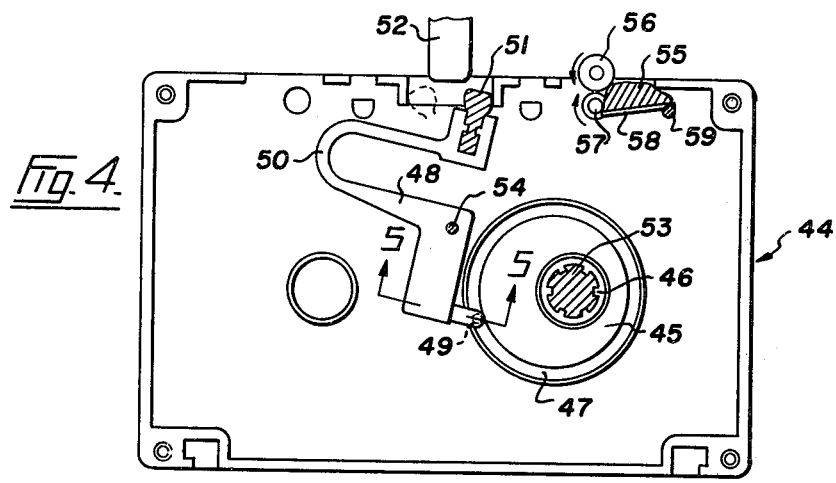
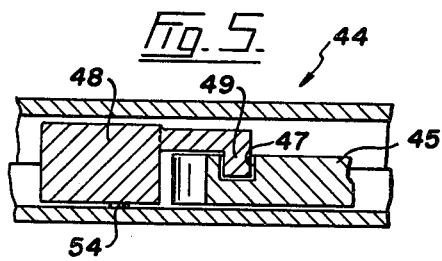

CLEANER FOR A PLAYING HEAD OF A CASSETTE PLAYER

RELATED APPLICATION

This application is a continuation in part of U.S. Application Ser. No. 685,593, filed on May 12, 1976 now abandoned.

FIELD OF INVENTION

This invention relates to a cleaner for a playing head of a cassette player.

DESCRIPTION OF THE PRIOR ART

Cassette tapes having a sprocket drive are becoming increasingly popular in tape playing machines. Increasingly they are replacing those cartridges in which the tape is driven by a capstan that, in turn, is driven by an electric motor. In a cartridge machine the tape is pinched between the capstan of the tape player and a pinch wheel in the cartridge. Rotation of the capstan by an electric motor drives the tape across a playing head to play the recorded sound. However, cassette players that have a sprocket drive have two reels and the magnetic tape is passed between the reels across a playing head. Drive in such a machine is by a sprocket in the cassette player engaging in teeth in the interior of the tape receiving reels. The sprockets turn, engage the teeth of the reels and thus force the tape across the tape playing head.

In many of the tape playing devices, cartridge or cassette, the cleaning of the tape heads can be a problem. This is particularly so in those tape players used in automobiles. Normally the tape playing head is positioned at the bottom of a recess that receives and retaines the cassette or cartridge tape in a playing position. The cassette or cartridge is typically provided with means to retain itself within the recess. However, the location of the tape playing head at the base of the recess makes the cleaning difficult. Yet for continued use it is essential that the tape playing head be kept clean.

There have been proposals to clean the playing head of tape players. Generally speaking, they rely on a hand operated lever extending through a cartridge. At one end of the lever there is a cleaning pad that contacts the tape playing head. At the other end of the lever, which extends through the back of the cartridge and out of the recess, there is a handle so that the cleaning pad can be reciprocated across the tape playing head. However, this can be undesirable. In particular, if a playing head performs badly in an automobile there is a temptation for the driver to clean the head while the car is moving, which is dangerous.

SUMMARY OF INVENTION

The present invention avoids the disadvantages of the prior art and, in particular, provides an automatic cleaner of the playing head of a cassette player. It is merely necessary to insert the cleaner of the present invention into the recess of the cassette player for the cleaner to clean the playing head of the cassette player. The cleaner may be left in position for a few minutes and then removed. After this, the playing head of the cassette player is adequately cleaned.

Accordingly, in one aspect, the present invention is a cleaner for a playing head of a cassette player having a sprocket drive and having a recess able to receive a cassette tape in a playing position, the cleaner comprising a hollow container dimensioned to be retainable within the recess; a hollow post within the container, positioned to permit the sprocket drive of the player to enter the interior of the container; a cam positioned on said post and rotatable thereon; drive means on said cam to engage the sprocket drive of the tape player; an opening in one side of the container; a lever pivotally located within the container to be reciprocable by the cam; the lever continuously engaging the cam; and means at one end of the lever to receive cleaning means for the cleaning head of the tape player, the cleaning means being able to project from the opening in the container to contact and clean the playing head when the cleaner is retained within the recess.

In a preferred form, the cam has a groove defining a closed path and the lever has means for following the groove. For example, the means for following the groove comprises a pin on the lever.

Preferably, the cam is generally circular and eccentrically displaced with respect to the hollow post and the groove is a generally circular peripheral groove on the cam.

BRIEF DESCRIPTION OF DRAWINGS

The invention is illustrated in the accompanying drawings in which:

FIG. 1 is a plan view showing a first embodiment of the present invention;

FIG. 2 is a more detailed view, similar to FIG. 1, showing the first embodiment of the present invention;

FIG. 3 is a partial section along the line 3—3 of FIG. 2 but with the top of the container also shown;

FIG. 4 is a plan view showing a second embodiment of the present invention;

FIG. 5 is a partial section along the line 5—5 of FIG. 3 showing only one end of the lever and a portion of the cam.

DESCRIPTION OF PREFERRED EMBODIMENTS

Referring to drawings 1 to 3, they illustrate a cleaner 2 for a playing head of a tape player. The tape player has a sprocket drive 4 formed with teeth 6. Only the sprocket drive, the capstan, and the playing head of the tape player are shown. The sprocket drive of the player is formed within a recess that is able to receive a cassette tape in a playing position.

The cleaner comprises a hollow container 7—only half of which is shown in FIGS. 1 and 2—that is dimensioned to be retainable within the recess of the tape player. To this end, the cleaner of the present invention may, insofar as retention within the recess is necessary, be an exact duplicate of a cassette tape. FIG. 2 illustrates that the cleaner is formed with holes 8 to receive retaining pins formed in the tape player recess and with holes 10 to receive the capstan of the tape player. FIG. 2 illustrates a capstan drive 11 in position in one of the holes 10.

The container 7 is formed with a hollow post 12 as indicated most clearly in FIG. 3 where the top and bottom parts of the post 12 are shown. Such a post 12 is conventional in a tape player having a sprocket drive. Normally it receives the reel. As shown in FIG. 3 the post is made up of two projections, one on the bottom of the container and the other on the top that meet in the middle to form hollow post 12. In the illustrated embodiment, the hollow post on the left of, for example, FIG. 2 is not necessary for the cleaning action but at least an opening is necessary in order to permit the cleaner 2 to be positioned within the recess since the recess is provided with two sprocket drives 4 so that the tape may be moved backward or forward within the cassette.

As indicated on the right of FIGS. 1 and 2 the sprocket drive 4 projects through the hollow post 12 into the interior of the container 7. There is a cam 14 positioned on the hollow post 12 and rotatable on the hollow post 12. The cam is made rotatable by the provision of a recess 16 dimensioned to be a fairly loose fit over the hollow post 12. The cam 14 is formed with internal teeth 18 which comprise a drive means on the cam 14. Teeth 18 engage the teeth 6 on the sprocket drive 4 of the tape player so that the cam 14 may be rotated by the sprocket drive 4 of the tape player.

There is an opening 20 formed in one side of the container 7. A lever 22 is pivotally located within the container 7. The lever 22 is provided with a slot 24 that engages on a post 26 formed in the container 7. A surface 28 of the lever 22 abuts the cam 14. Surface 28 is urged into position by a coil spring 30 stretched between a first post 32 formed on the lever 22 and a second post 34 formed within the container 7. Coil spring 30 thus continually urges the surface 28 on lever 22 into contact with the cam 14. It also urges the lever 22 outwardly of the opening 20.

As indicated in FIGS. 1 and 2 the lever 22 is formed with a recess 36 at one end. Recess 36 holds an absorbent pad 38 that can be soaked with fluid to clean the playing head of the tape player. To do this, the cleaning means projects from the opening 20 in the front of the container 7. Opening 20 is aligned with the playing head 43 of the cassette player. Pad 38 is urged outwardly by coil spring 30 against the playing head 43 of the cassette player.

In the embodiment illustrated in FIG. 2 the container is also provided with a second pad 40 that is retained in recesses 42 formed in the container 7. The second pad 40 is pressed against the capstan of the cassette player.

In operation, the cleaner according to the present invention is simply pressed into the recess of a cassette player. This action operates the conventional microswitches on the player so that the sprocket drive 4 of the cassette player is caused to rotate. Pressing the container 7 into the recess automatically aligns the teeth 18 on cam 14 with teeth 6 on the sprocket driver 4. Thus, the cam 14 is rotated. Rotation of the cam 14 causes reciprocation of the lever 22 about the post 26 so that the pad 38 is moved back and forth across the playing head 43 of the cassette player. After a few minutes the cleaner may be removed just like a conventional cassette tape and the playing head is clean.

The container 7 of the cleaner 2 of the present invention may be made of the usual plastics from which cassettes are made. The lever 22 and the cam 14 may be made of any suitable plastics material, for example, nylon. As indicated above the container 7 may, in fact, be a conventional cassette but in that case it is usually necessary to modify the openings of the cassette to from the wider openings 20 required by the cleaner of the present invention.

FIGS. 4 and 5 illustrate a second embodiment of the invention. Cleaner 44 is generally similar in construction and operation to cleaner 2 and will be discussed in sufficient detail only to bring out the differences between the two embodiments. There is a cam 45 with internal teeth 46 which comprise the drive means on the cam 45. The circular cam 45 has a peripheral groove 47. Lever 48 has a pin 49 and, as may best be seen in FIG. 5, the pin 49 of the lever 48 engages the groove 47 of the cam 45. The lever 48 has an integral loop 50 comprising means for resiliently biasing the pad 51 against the playing head 52. The loop 50 permits a limited deformation of lever 48 as pad 51 contacts playing head 52. In operation, as cam 45 is rotated by the sprocket drive 53 of the cassette player, pin 49 follows groove 47 of cam 45. This causes lever 48 to reciprocate back and forth about pin 54 and pad 51 to move back and forth against playing head 52.

Felt pad 55 is provided in cleaner 44 for cleaning pinch roller 56 and capstan 57. Nylon spring 58 is attached to cleaner 44 at pin 59 and applies continuous pressure against pad 55 for cleaning pinch roller 56 and capstan 57. There is no tendency for pad 55 to be drawn between capstan 57 and pinch roller 56 because of the opposing direction of rotation of both.

As may be seen, cleaners 2 and 44 provide for continuous back and forth movements of pads 38 and 51 respectively across playing heads 43 and 52 respectively.

I claim:

1. A cleaner for a playing head of a cassette player having a sprocket drive and having a recess able to receive a cassette tape in a playing position, the cleaner comprising:
    a hollow container dimensioned to be retainable within the recess;
    a hollow post within the container, positioned to permit the sprocket drive of the player to enter the interior of the container;
    a cam positioned on said post and rotatable thereon;
    drive means on said cam to engage the sprocket drive of the tape player;
    an opening in one side of the container;
    a lever pivotally located within the container to be reciprocable by the cam;
    means at one end of the lever to receive cleaning means for the playing head of the tape player, the cleaning means being able to project from the opening in the container to contact and clean the playing head when the cleaner is retained within the recess; and
    means for continuously engaging the lever and the cam.

2. A cleaner as claimed in claim 1 in which the drive means on said cam are teeth positioned around the circumference of an opening formed in the cam to engage the drive sprocket of the tape player.

3. A cleaner as claimed in claim 1 in which the lever is provided with a slot that engages on a post within the container to provide a pivotal mount for the lever.

4. A cleaner as claimed in claim 1 wherein the means for continuously engaging comprises means urging the lever towards the cam and urging the lever outwardly of the opening.

5. A cleaner as claimed in claim 4, wherein the means for continuously engaging the lever and the cam is a coil spring.

6. A cleaner as claimed in claim 5 in which the lever is formed with a first post to engage the first end of the coil spring and in which the container has a second post to engage the second end of the coil spring, the coil spring being stretched between the posts to urge the lever towards the cam and outwardly of the opening.

7. A cleaner as claimed in claim 1 in which the cleaning means is a felt pad able to receive a cleaning fluid.

8. A cleaner as claimed in claim 1 provided with means to locate additional cleaning means against the capstan of the tape cleaner.

9. A cleaner as claimed in claim 8, in which the additional cleaning means is a felt pad able to absorb a cleaning fluid.

10. A cleaner as claimed in claim 1 wherein: the means for continuously engaging the lever and the cam comprises a groove on the cam defining a closed path; and means on the lever for following the groove.

11. A cleaner as claimed in claim 10, wherein the means for following the groove comprises a pin on the lever.

12. A cleaner as claimed in claim 11, wherein the cam is generally circular and eccentrically displaced with respect to the hollow post, the groove being a generally circular peripheral groove on the cam.

13. A cleaner as claimed in claim 10, wherein the lever includes means for resiliently biasing the cleaning means against the playing head.

14. A cleaner as claimed in claim 10, wherein the means for resiliently biasing the cleaning means comprises a resilient loop integral with the lever.

15. A cleaner as claimed in claim 10, including means for cleaning a capstan and pinch roller on the cassette player comprising:
   a pad;
   a resilient means attached to the pad and attached at one end to the cleaner for continuously urging the pad against the capstan and roller.

16. A cleaner as claimed in claim 1, the cam being generally circular and eccentrically displaced.

* * * * *